United States Patent
Otsuki et al.

(10) Patent No.: US 7,270,270 B2
(45) Date of Patent: Sep. 18, 2007

(54) OPTICAL SCANNER CONTROL METHOD, OPTICAL SCANNER AND LASER MACHINING APPARATUS

(75) Inventors: Haruaki Otsuki, Tsuchiura (JP); Souichi Toyama, Ebina (JP); Kenta Seki, Tsuchiura (JP); Yaichi Okubo, Ebina (JP); Daisuke Kitamura, Ebina (JP)

(73) Assignee: Hitachi Via Mechanics Ltd., Ebina-shi (JP)

( * ) Notice: Subject to any disclaimer, the term of this patent is extended or adjusted under 35 U.S.C. 154(b) by 197 days.

(21) Appl. No.: 10/929,519

(22) Filed: Aug. 31, 2004

(65) Prior Publication Data

US 2005/0184156 A1    Aug. 25, 2005

(30) Foreign Application Priority Data

Feb. 19, 2004    (JP)    ............... 2004-043050

(51) Int. Cl.
*G06K 7/10*    (2006.01)
(52) U.S. Cl. .............. 235/454; 235/462.36; 235/462.37
(58) Field of Classification Search ................ 235/454, 235/462.36, 462.37, 462.38
See application file for complete search history.

(56) References Cited

U.S. PATENT DOCUMENTS

| | | | |
|---|---|---|---|
| 5,463,202 A * | 10/1995 | Kurosawa et al. ..... | 219/121.83 |
| 5,856,880 A * | 1/1999 | Farina et al. ................. | 349/20 |
| 6,188,078 B1 * | 2/2001 | Bell et al. ................ | 250/559.1 |
| 6,545,250 B2 * | 4/2003 | Hartmann et al. ..... | 219/121.83 |
| 2001/0023862 A1 * | 9/2001 | Hartmann et al. ..... | 219/121.83 |
| 2002/0049513 A1 * | 4/2002 | Nussbaum et al. ......... | 700/186 |
| 2004/0112876 A1 * | 6/2004 | Watanabe .............. | 219/121.67 |
| 2005/0187650 A1 * | 8/2005 | Toyama et al. ............. | 700/166 |

FOREIGN PATENT DOCUMENTS

| | | |
|---|---|---|
| JP | 2002-006255 | 1/2002 |
| JP | 2002137074 | 5/2002 |

* cited by examiner

*Primary Examiner*—Steven S. Paik
(74) *Attorney, Agent, or Firm*—Crowell & Moring LLP

(57) ABSTRACT

A optical scanner control method and a optical scanner capable of positioning a mirror at a high speed independently of a rocking angle, and a laser machining apparatus for irradiating a printed circuit board with a laser beam by use of the optical scanner to thereby perforate the printed circuit board. In order to operate an actuator for rocking the mirror based on a deviation of a current position from an commanded value, a change in gain of the actuator is measured in accordance with each rocking angle in advance, and the manipulated variable of the actuator is corrected to cancel the change in gain. Thus, the influence of the alteration of a torque constant in accordance with the rocking angle can be suppressed so that the response characteristic becomes uniform all over a scanning region, and the positioning speed can be improved.

5 Claims, 8 Drawing Sheets

PRIOR ART

PRIOR ART

PRIOR ART

US 7,270,270 B2

OPTICAL SCANNER CONTROL METHOD, OPTICAL SCANNER AND LASER MACHINING APPARATUS

FIELD OF THE INVENTION

The present invention relates to an optical scanner control method and an optical scanner for scanning lights such as laser beams, and a laser machining apparatus for irradiating a printed circuit board with laser beams by use of such an optical scanner so as to perforate the printed circuit board.

BACKGROUND ART OF THE INVENTION

A printed circuit board perforating laser machining apparatus as an example of a laser apparatus having a function of scanning with laser beams is an apparatus for irradiating a printed circuit board with pulsed laser beams so as to make holes for connecting conductor layers of the board with each other. For example, a background-art printed circuit board perforating laser machining apparatus has an XY table servo mechanism and a pair of optical scanner servo mechanisms (for example, see JP-A-2002-137074, page 2 and FIG. 6). A printed circuit board is mounted on the XY table servo mechanism and moved thereby in X)- and Y-directions within a horizontal plane. The pair of optical scanner servo mechanisms are provided for scanning the printed circuit board with laser beams in the X- and Y-directions.

As for the structure of an optical scanner, for example, a coil is fixed to a central section of a single-piece penetrating rocking shaft, and a pair of bearings are disposed adjacently to the opposite ends of the coil. An angle detector is disposed outside one of the bearings, while a mirror mounting portion is disposed outside the other bearing (for example, see JP-A-2002-6255, page 2 and FIG. 6).

Description will be made below more in detail with reference to the drawings.

FIG. 5 is a block diagram showing an example of the configuration of a mirror servo mechanism (optical scanner servo mechanism) in a background-art laser machining apparatus.

An electromagnetic rocking actuator 110 of a optical scanner 100 rocks a rocking shaft 111. A mirror 130 is attached to one end portion of the rocking shaft 111 with a mirror mount 131, while an angle detector 120 is attached to the other end portion.

Due to the aforementioned configuration, the direction of the mirror 130 is changed in accordance with the rocking of the rocking shaft 111 so that the outgoing direction of a laser beam 30 incident on the mirror 130 is changed. The rocking angle of the rocking shaft 111, that is, the mirror 130 is detected by the angle detector 120.

An upper control unit 10 compiles an NC program and gives an command to a optical scanner control unit 20 as to a target positioning angle 11 of the mirror 130 in accordance with the position on a to-be-machined piece on which the laser beam 30 should be positioned.

FIG. 6 is a block diagram of a scanner servo mechanism constituting the background-art optical scanner control unit 20. A portion to be executed by software with a servo processor is illustrated on the left of the broken line, and the connection relationship of hardware and the flow of signals are illustrated on the right.

A target trajectory generating unit 210 calculates a target value 215 of the rocking angle of the optical scanner every moment based on the target positioning angle 11, and generates a target trajectory of the scanner servo mechanism.

A detected rocking angle 255 of the scanner is subtracted from the target value 215 by a subtracting unit 222 so as to obtain a deviation 225. The deviation 225 is subjected to control and processing in a compensating element 220 so that a manipulated variable signal 226 is calculated. The manipulated variable signal 226 is converted into an analog signal in a D/A converter 230. Thus, an commanded value (driving signal) 21 of a current control system 240 is obtained. An armature of the actuator 110 is connected to the output side of the current control system 240, and a current detection resistor 241 is connected in series with the armature. The terminal voltage of the current detection resistor 241 is detected by a differential amplifier 242, and fed back to the current control system 240 as a current signal. An encoder 120 linked with the rocking shaft 111 generates pulses (position signal) 22 in accordance with the rocking quantity. The pulses are counted in a pulse counter 250 and fed back as a rocking angle 255.

When the aforementioned processes are repeated, the mirror 130 approaches the target position gradually. When the mirror 130 has been positioned, a positioning completion signal 12 is sent from the optical scanner control unit 20 to the upper control unit 10.

The laser beam 30 outputted from a not-shown laser oscillator is reflected by the mirror 130. Thus, a machining position of the piece to be machined is irradiated with the reflected laser beam 30 through an Fθ lens 140. In FIG. 5, three machining positions A, B and C corresponding to three rocking angles of the mirror 130 are illustrated.

FIG. 7 is a sectional view of the actuator.

A cylindrical inner yoke 112 is disposed to surround the rocking shaft 111. Outside the inner yoke 112, circumferentially divided four permanent magnets 113a, 113b, 113c and 113d are disposed to be separated from the inner yoke 112 through a cylindrical air gap G. The permanent magnets 113a to 113d have been magnetized to be polarized radially. The permanent magnets 113a and 113c are magnetized in one direction, while the permanent magnets 113b and 113d are magnetized in the opposite direction.

An outer yoke 114 is disposed outside the permanent magnets 113a to 113d, and these parts form a magnetic circuit. Due to a magnetic field formed by the permanent magnets 113a to 113d and the inner yoke 112, a magnetic flux M is generated substantially radially in the air gap G. In addition, strand sets 115a, 115b, 115c and 115d forming the coil of the armature are disposed in the air gap G as illustrated.

With the configuration described above, when a current is applied to the coil, a current flows in the illustrated direction in the strand sets 115a, 115b, 115c and 115d. Due to the interaction between the magnetic flux and the current, a force (Lorentz force) acts on the strand sets 115a to 115d circumferentially. Since the coil, that is, the strand sets 115a to 115d are fixed to the rocking shaft 111, the force serves as a torque for driving the rocking shaft 111. The torque is proportional to the current flowing through the coil, and the proportionality factor is a torque constant.

In recent years, there has increased a requirement to improve the efficiency in machining with a optical scanner application product such as a laser machining apparatus. High speed response is also required to a optical scanner servo mechanism. A optical scanner operates to rock a mirror within a limited angle range, but the characteristic of the optical scanner is not always uniform in this angle range.

That is, in the optical actuator 110 shown in FIG. 7, the magnetic flux M near the center of each permanent magnet 113a-113d trends radially, but tilts with respect to the radial direction and is low in density as approaches an end portion of the permanent magnet 113a-113d. Therefore, the torque constant is lowered when the strand sets 115a-115d approach the end portions of the permanent magnets 113a-113d.

FIG. 8 is a graph showing a relationship between the rocking angle and the torque constant. The rocking angle $\theta_B$ designates the center of rocking, the rocking angle $\theta_A$ designates a negative-side angle, and the rocking angle $\theta_C$ designates a positive-side angle. The rocking angles $\theta_A$, $\theta_B$ and $\theta_C$ correspond to the machining positions A, B and C in FIG. 5 respectively.

FIG. 9 is a graph showing deviation signals of the servo mechanism when positioning was performed in identical strokes in the machining positions with the rocking angles $\theta_A$, $\theta_B$ and $\theta_C$.

As is apparent from FIG. 9, a suitable response is shown at the rocking angle $\theta_B$, but overshoot appears at the rocking angle $\theta_A$ or $\theta_C$. That is, due to the torque constant changing in accordance with the rocking angle, there occurs a problem that the servo mechanism having good positioning responsiveness at one angle produces overshoot or overdamp at another angle.

However, it is difficult to uniformalize the intensity of the magnetic field acting on the coil independently of the rocking angle. Accordingly, the magnitude of the torque acting on the rotor alters in accordance with the rocking angle in spite of the same current applied thereto. In the same manner, even in an optical scanner generating torque by use of another structure, it is difficult to prevent the torque constant from having any alteration depending on the rocking angle.

SUMMARY OF THE INVENTION

It is an object of the present invention to provide an optical scanner control method and an optical scanner in which a mirror can be positioned at a high speed independently of a rocking angle, and a laser machining apparatus for radiating a printed circuit board with a laser beam using the optical scanner so as to perforate the printed circuit board.

According to a first configuration of the present invention, there is provided an optical scanner control method for operating an actuator for rocking a mirror based on a deviation of a current position from an commanded signal so as to control an outgoing angle of light incident on the mirror, the optical scanner control method including the steps of: measuring a change in gain of the actuator in accordance with a rocking angle in advance, and correcting a manipulated variable of the actuator so as to cancel the change in gain.

According to a second configuration of the present invention, there is provided an optical scanner for operating an actuator for rocking a mirror based on a deviation of a current position from an commanded signal so as to control an outgoing angle of light incident on the mirror, the optical scanner including a unit for measuring a change in gain of the actuator in accordance with a rocking angle, so that a change in gain is measured by the measuring unit prior to real operation, the measuring result is stored, and a manipulated variable of the actuator is corrected in real operation so as to cancel the change in gain.

According to a third configuration of the present invention, there is provided a laser machining apparatus including a optical scanner defined in the second configuration, by which a work is scanned and machined with a laser beam.

The mirror can be positioned at a high speed independently of the rocking angle so that the machining speed can be improved.

DESCRIPTION OF THE PREFERRED EMBODIMENTS

Figure 1:
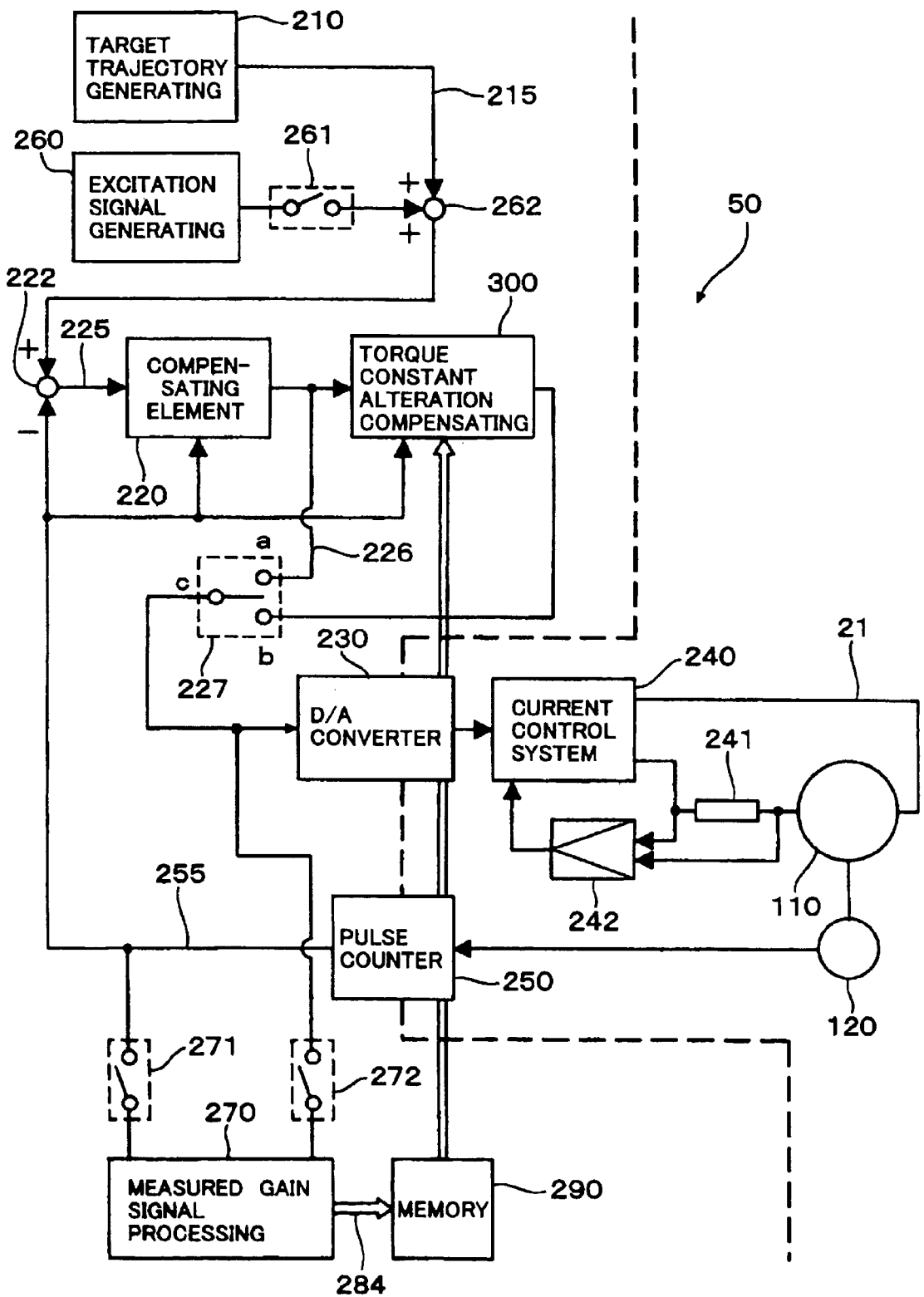
FIG. 1 is a block diagram of a scanner servo mechanism constituting a optical scanner control unit having a torque constant measuring function according to the present invention.
Figure 6:
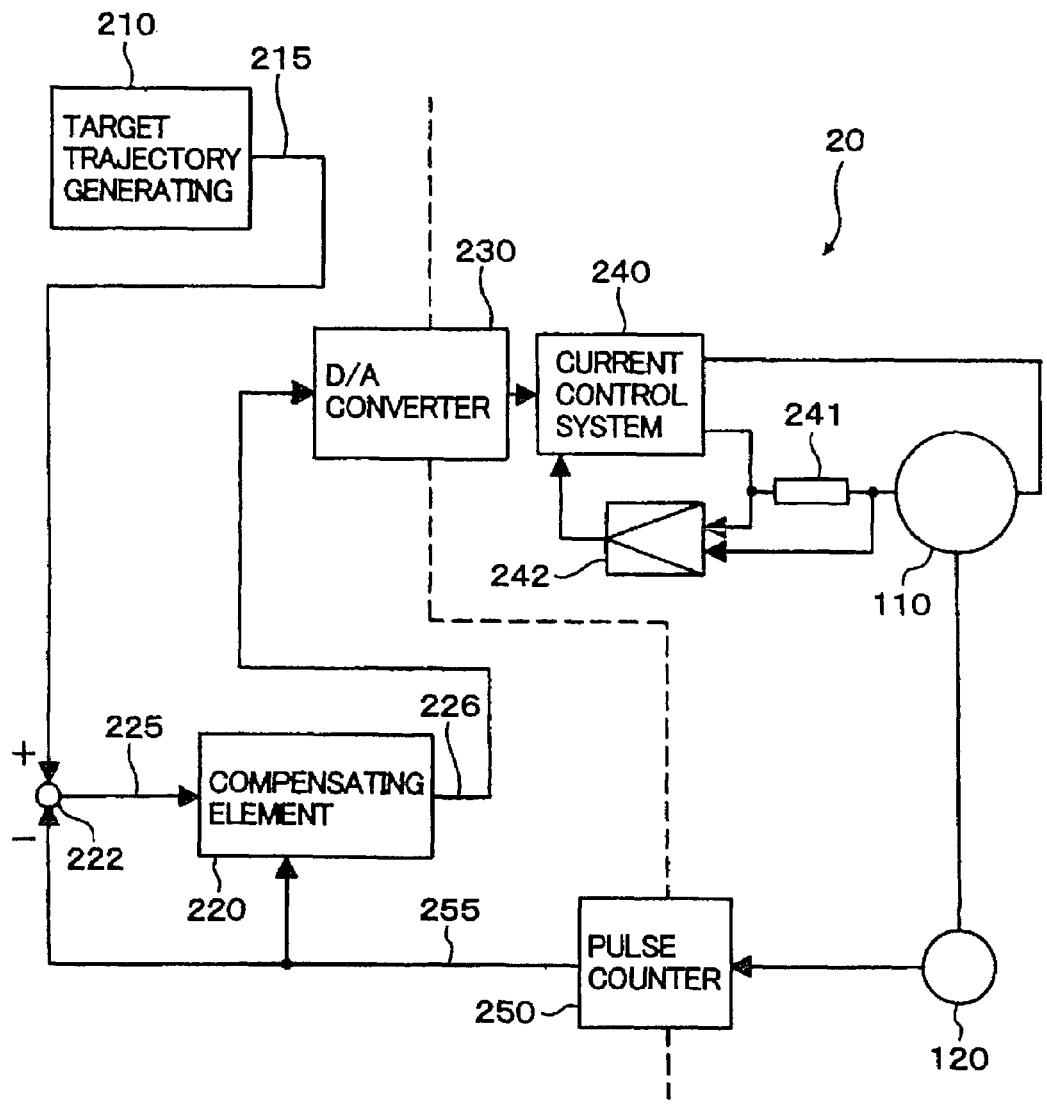
FIG. 6 is a block diagram of a scanner servo mechanism constituting a background-art optical scanner control unit.
Figure 7:
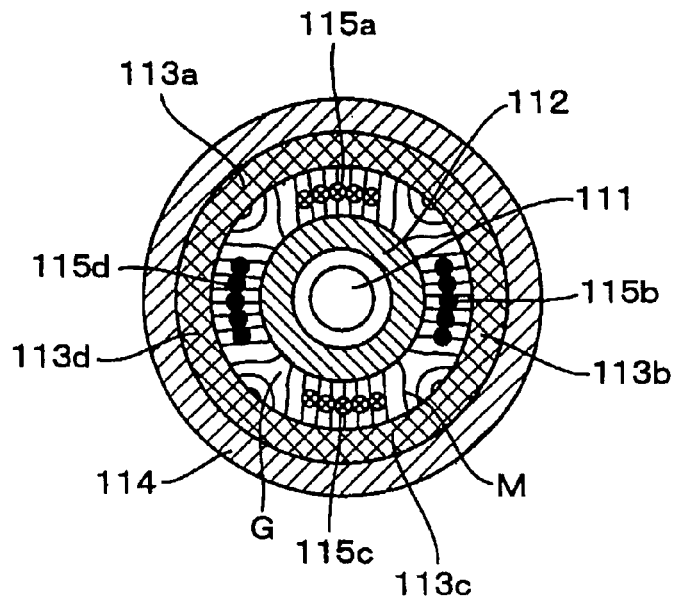
FIG. 7 is a sectional view of an actuator.

FIG. 1 is a block diagram of a scanner servo mechanism constituting a optical scanner control unit 50 having a torque constant measuring function according to the present invention. A portion to be executed by software with a servo processor is illustrated on the left of the broken line, and the connection relationship of hardware and the flow of signals are illustrated on the right. Incidentally, functions equivalent to those in FIG. 6 are referenced correspondingly, and redundant description thereof will be omitted. Though not shown, the optical scanner control unit 50 has a LAN interface such that the optical scanner control unit 50 can communicate with a remote host computer through a LAN.

An excitation signal generating unit 260 generates a sine-wave signal having a small amplitude. Here, the frequency of the sine wave is set to be away from resonance frequencies of a scanner actuator to be controlled, frequencies of various noises from amplifiers, a low frequency band conspicuously affected by friction, or the like, and to be a frequency in which the transfer function shows a double integral characteristic as an inertial body.

A signal connection/disconnection processing unit 261 connects or disconnects the signal outputted from the excitation signal generating unit 260 to or from an adding unit 262. The adding unit 262 adds the signal outputted from the excitation signal generating unit 260 to the target value 215 outputted from the target value generating unit 210, and outputs the result of the addition to a subtracter 222.

The output of a compensating element 220 is supplied to a terminal a of a signal connection changeover processing unit 227 and a torque constant alteration compensating unit 300. The output of the torque constant alteration compensating unit 300 is supplied to a terminal b of the signal connection changeover processing unit 227. The output of the signal connection changeover processing unit 227 is supplied to the D/A converter 230 through a terminal c.

A rocking angle 255 is inputted into the measured gain signal processing unit 270 through a signal connection/disconnection processing unit 271, while a manipulated variable signal 226 is inputted thereto through a signal connection/disconnection processing unit 272. A processing result 284 is stored in an address assigned in a memory 290.

Next, description will be made about the measured gain signal processing unit 270.

Figure 2:
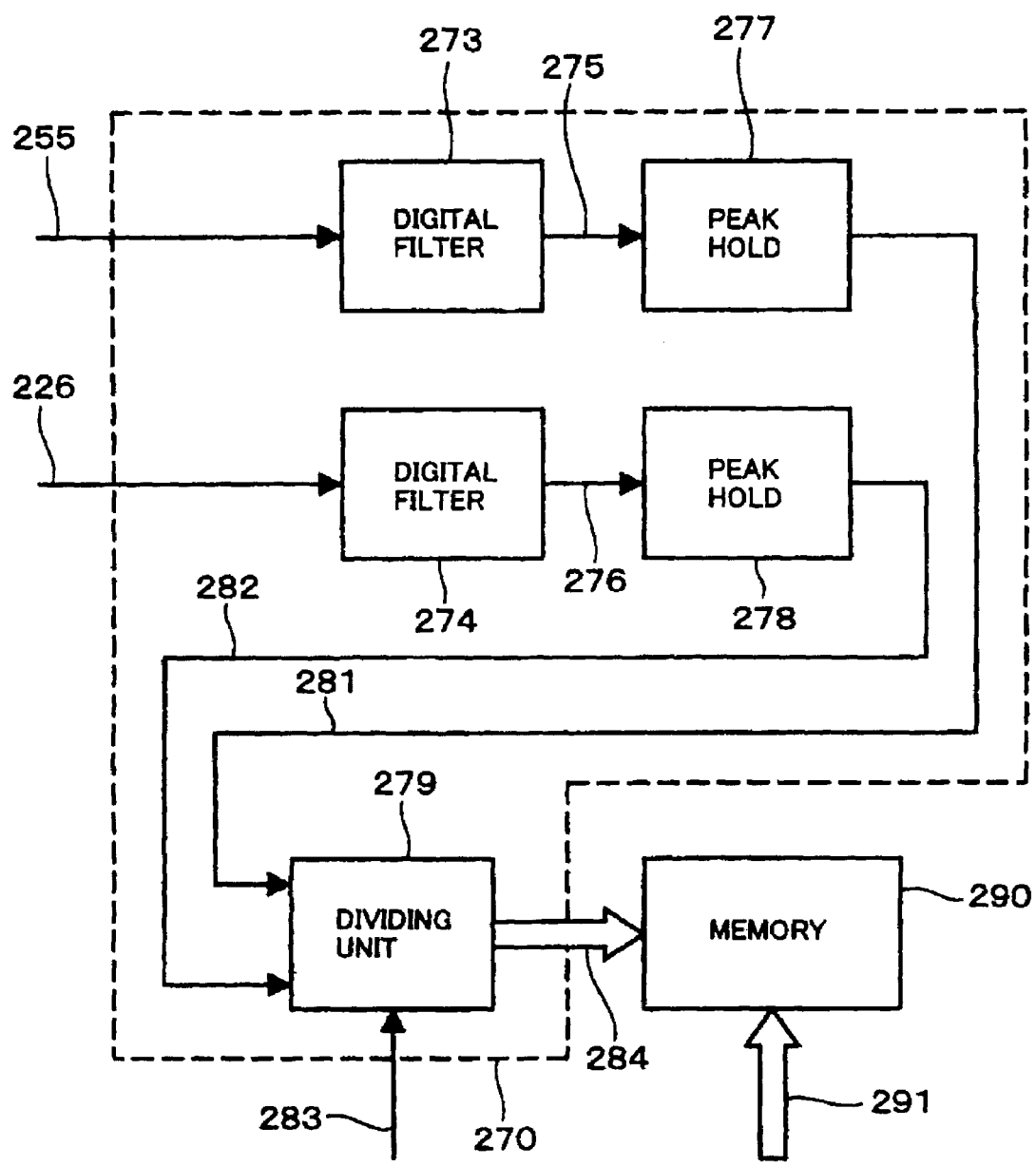
FIG. 2 is a block diagram about processing a measured gain signal according to the present invention.

FIG. 2 is a block diagram showing the configuration of the measured gain signal processing unit according to the present invention.

The input side of a first digital filter 273 is connected to the signal connection/disconnection processing unit 271, while an output signal is inputted into a dividing unit 279 through a first peak hold processing unit 277. The input side of a second digital filter 274 is connected to the signal connection/disconnection processing unit 272, while an output signal is inputted into the dividing unit 279 through a second peak hold processing unit 278. The first and second digital filters 273 and 274 have a band pass characteristic passing a frequency component identical to the frequency of the sine wave generated by the excitation signal generating unit 260, but cutting off the other components. Incidentally, the reference numeral 283 in FIG. 2 represents a timing signal.

Next, the operation of the present invention will be described.

As described above, the torque constant changes in accordance with the rocking angle. Accordingly, in order to suppress the fluctuation of the response waveform, it is necessary to measure the alteration of the torque constant shown in FIG. 8 in accordance with an individual scanner and settings thereof.

Therefore, the torque constant corresponding to each rocking angle is measured in the following procedure prior to positioning.

First, the signal connection/disconnection processing units 261, 271 and 272 are set on the connection side, while the terminal c of the signal connection changeover processing unit 227 is connected to the terminal a so that the output signal of the compensating element 220 is supplied directly to the D/A converter 230. In this state, the target value generating unit 210 sets the target value 215 corresponding to a rocking angle to be measured, while the excitation signal generating unit 260 generates a sine wave signal having a small amplitude. The sine wave signal outputted from the excitation signal generating unit 260 is added to the target value 215 by the adding unit 262. Thus, the rocking shaft 111 is driven to draw a sine wave around the rocking angle to be measured.

The rocking angle 255 and the manipulated variable signal 226 are imported in every sampling period, and processed by the first and second digital filters 273 and 274 respectively. The first and second digital filters 273 and 274 have a band pass characteristic passing a frequency component identical to the frequency of the sine wave generated by the excitation signal generating unit 260, but cutting off the other components. Therefore, when a brief time has passed since the beginning of the excitation, an input signal component 275 to the device to be controlled corresponding to the excitation signal and an output signal component 276 from the device to be controlled corresponding to the excitation signal appear on the outputs of the filters 273 and 274 respectively. The first and second digital filters 273 and 274 perform identical processing. Accordingly, influences of the filters cancel each other when the transfer characteristic between the input signal component 275 and the output signal component 276 is examined.

The input signal component 275 and the output signal component 276 are inputted into the first and second peak hold processing units 277 and 278 respectively. Thus, peak values of the sine wave signal are held, and an input signal amplitude 281 and an output signal amplitude 282 are obtained as outputs.

After a sufficient time has passed, division processing is performed in the dividing unit 279 in response to the timing signal 283, so that the input signal amplitude 281 is divided by the output signal amplitude 282. Thus, a reciprocal 284 of the gain of the device to be controlled is calculated and stored in an address of the memory 290 specified by the address 291 corresponding to the measured rocking angle.

A series of processes described above with reference to FIGS. 1 and 2 are repeated while changing the target value of the rocking angle step by step within a movable range. Thus, changes in torque constant are measured all over the movable range, and stored in the memory 290.

At the time of machining, the signal connection/disconnection processing units 261, 271 and 272 are set on the disconnection side, while the terminal c of the signal connection changeover processing unit 227 is connected to the terminal b so that the output signal of the compensating element 220 is supplied to the D/A converter 230 through the torque constant alteration compensating unit 300. Then, the torque constant alteration compensating unit 300 amplifies the manipulated variable signal 226 in accordance with the rocking angle 255, that is, the rocking angle θ with reference to the memory 290 so as to cancel the change in torque constant (for example, so as to make the torque constant equal to the largest one of the torque constants obtained by measuring). The torque constant alteration compensating unit 300 outputs the amplified manipulated variable signal 226 to the D/A converter 230. As a result, the torque constant is fixed independently of the rocking angle θ. Thus, the mirror can be positioned at a high speed so that the machining speed can be improved.

Incidentally, even when the target value 215 is used instead of the rocking angle 255 with reference to the memory 290, considerable compensating effect can be obtained.

When it is intended to improve the positioning accuracy in the aforementioned method, the number of measurements of the rocking angle θ have to be increased. Thus, the time required for measuring changes in torque constant is prolonged. When the following method is used, the positioning accuracy can be improved while the measuring time can be shortened.

Figure 3:
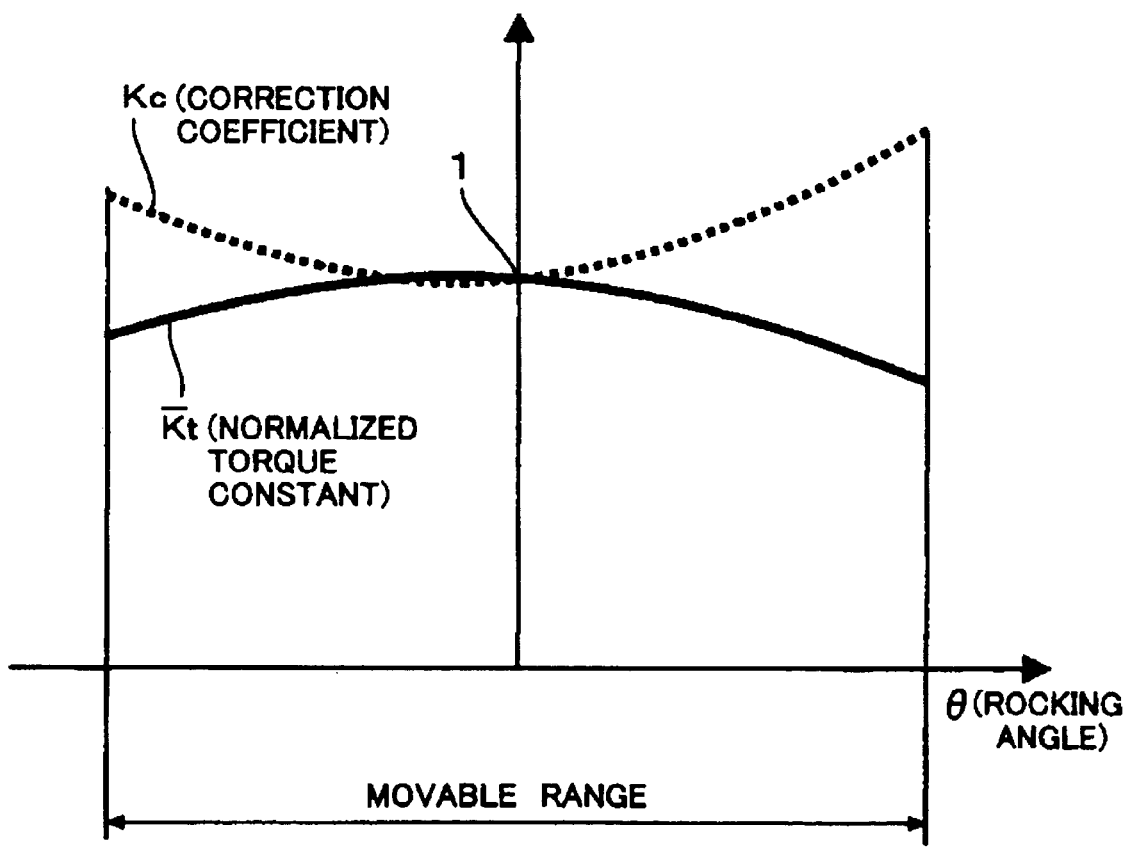
FIG. 3 is a graph showing a relationship between a rocking angle and a torque constant.
Figure 8:
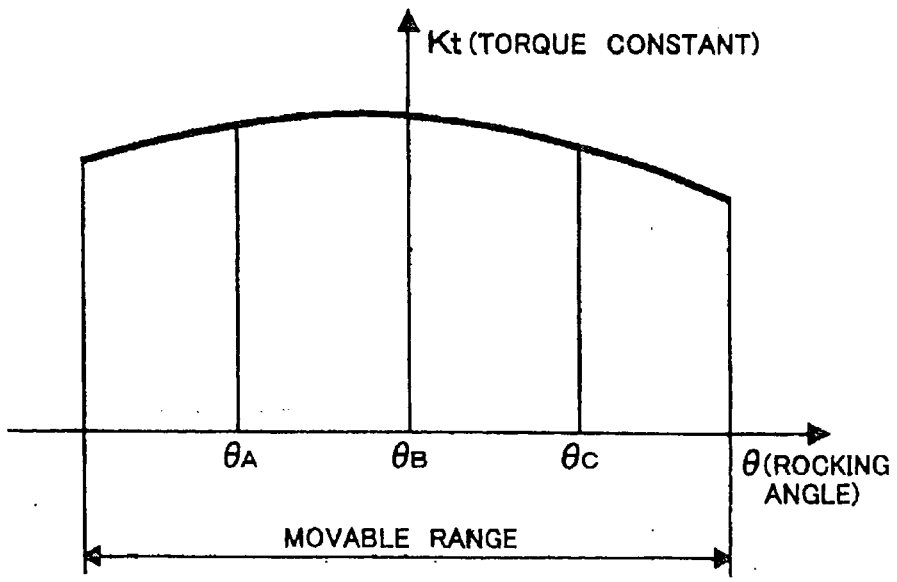
FIG. 8 is a graph showing a relationship between a rocking angle and a torque constant.
Figure 9:
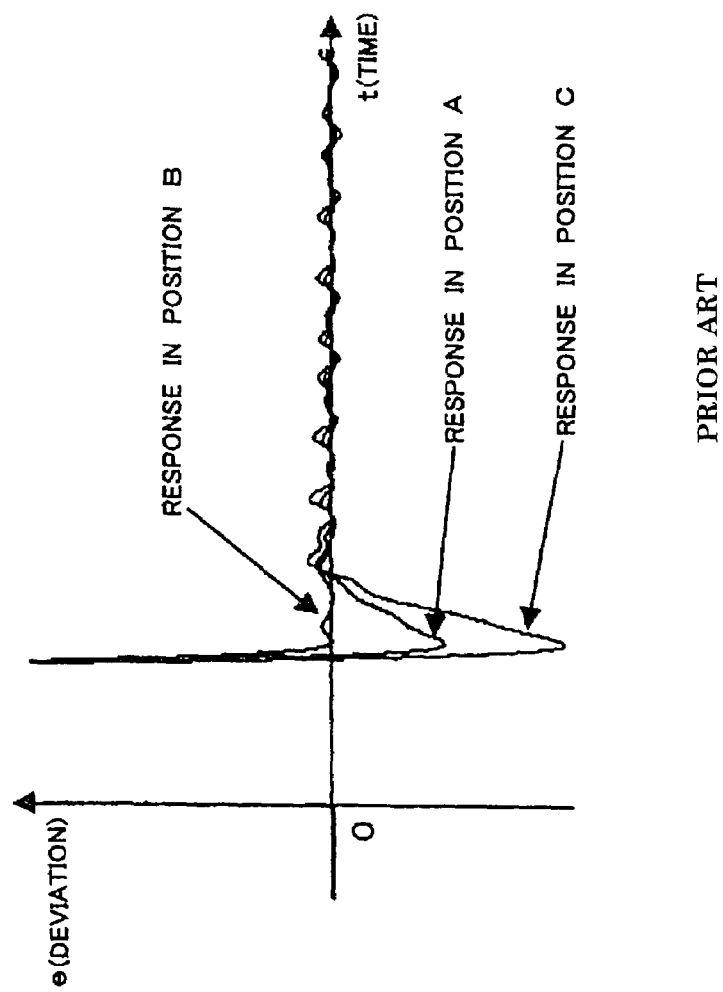
FIG. 9 is a graph showing deviation signals of the servo mechanism when positioning was performed in identical strokes in machining positions with rocking angles $\theta_A$, $\theta_B$ and $\theta_C$.

That is, most of changes in torque constant exhibit the characteristic shown in FIG. 8. Normalized with respect to a torque constant at the origin which is the center of the movable range, the torque constants draw a curve illustrated by the solid line in FIG. 3. Then, the value at the origin is 1. Reciprocals of the normalized torque constants draw a curve illustrated by the broken line in FIG. 3, which curve can be approximated by a biquadratic function of the rocking angle. This biquadratic function is expressed by:

$$K_c = a_1\theta^4 + a_2\theta^3 + a_3\theta^2 + a_4\theta + a_5 \quad \text{Expression 1}$$

wherein $K_c$ designates the reciprocal of the gain of the device to be controlled, θ designates the rocking angle, and $a_1$, $a_2$, $a_3$, $a_4$ and $a_5$ designate coefficients. Assume that in rocking angles $$\theta=[\theta_1, \theta_2, \ldots, \theta_n] \quad \text{Expression 2}$$

gains $$K_c=[K_{c1}, K_{c2}, \ldots, K_{cn}] \quad \text{Expression 3}$$

are obtained by a series of measurements. When n=5, the coefficients $a_1$, $a_2$, $a_3$, $a_4$ and $a_5$ are determined uniquely. When n is larger than 5, the coefficients can be determined in a least square method. When A designates an estimated value of each coefficient obtained thus, correction coefficients can be calculated by the following expression.

$$K_c=A_1\theta^4+A_2\theta^3+A_3\theta^2+A_4\theta+A_5 \quad \text{Expression 4}$$

In such a configuration, the torque constant alteration compensating unit 300 calculates a correction coefficient from the rocking angle and the coefficients, multiplies the manipulated variable signal 226 by the calculated correction coefficient, and delivers the obtained manipulated variable signal 226 to the D/A converter 230. Thus, the change in torque constant at each rocking angle with respect to the torque constant at the origin is compensated so that the dynamic characteristic of the servo mechanism can be kept constant.

The change in torque constant typically differs from one optical scanner to another, and there is also a secular change. In addition, the torque constant changes in accordance with how to attach the optical scanner to the laser machining apparatus or how to attach the mirror to the optical scanner. Therefore, when the scanner or the mirror is removed and attached again due to maintenance or the like, initial response may be not reproduced even in one and the same machining position. According to the present invention, however, the machining speed can be always improved.

Although it is assumed in Expression 1 that the biquadratic curve is symmetric with respect to the center (that is, the rocking angle θ=0), the maximum torque constant may be out of the center of the movable range due to a variation in characteristic among the permanent magnets 113a-113d, a variation among the strand sets 115a-115d, a variation in assembling, or the like. Even in such a case, a displacement from the center of the biquadratic curve can be obtained when the number n of samples is set to be 5 or more. Thus, accurate compensation can be attained.

Although the torque constant alteration compensating unit 300 is disposed between the compensating element 220 and the D/A converter 230 in the aforementioned embodiment, a forward portion in the servo control loop, that is, a not-shown gain in the compensating element 220 may be corrected.

Figure 4:
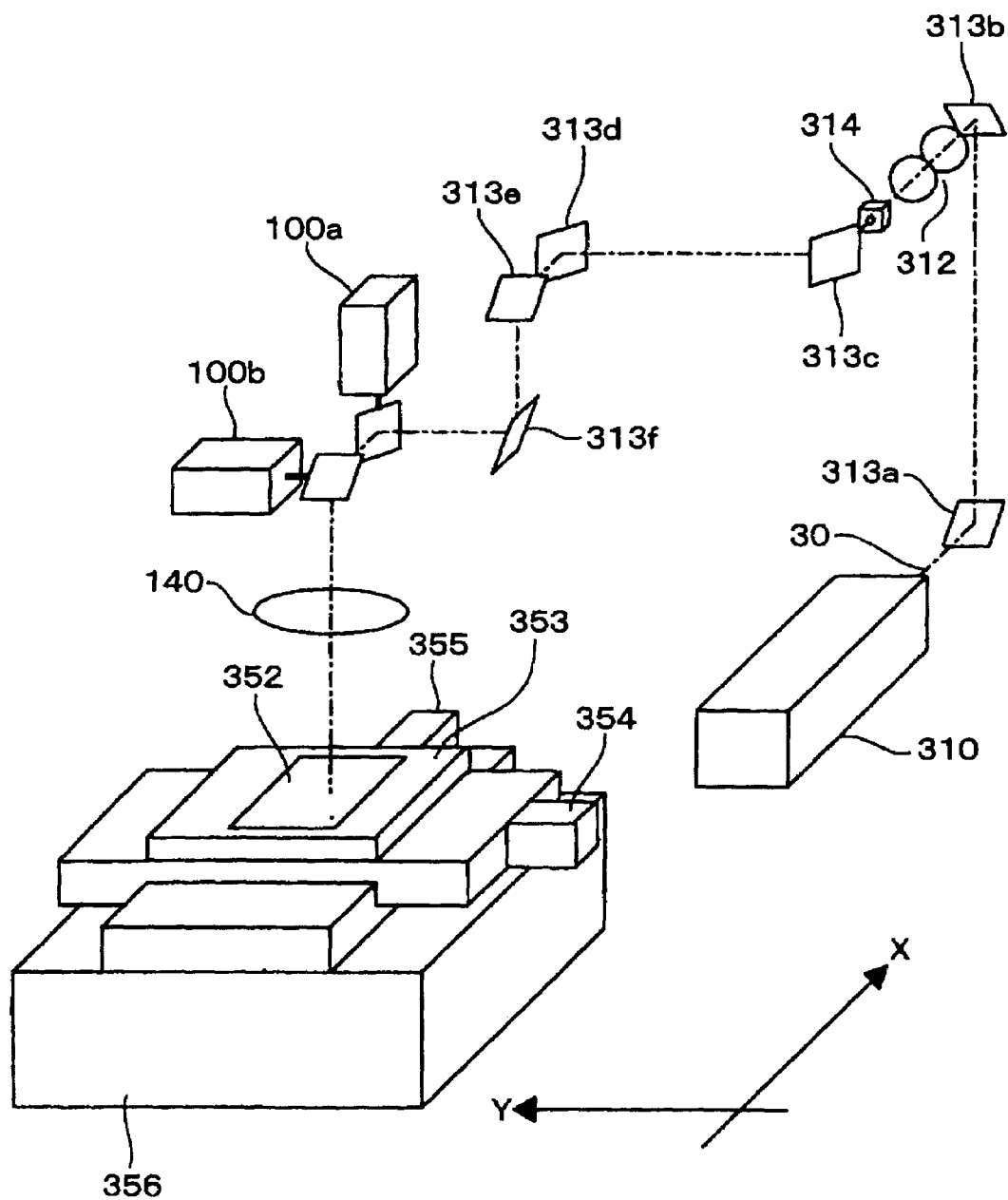
FIG. 4 is a configuration diagram of a printed circuit board perforating laser machining apparatus to which the present invention is applied.
Figure 5:
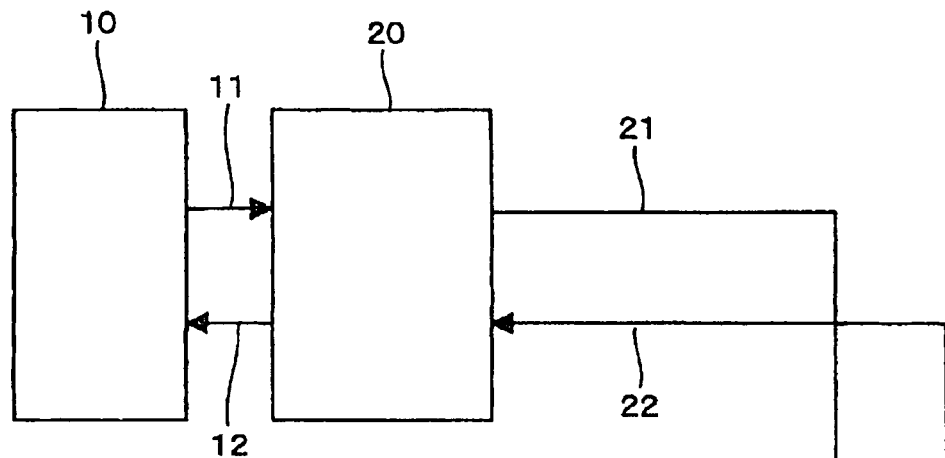
FIG. 5 is a block diagram showing a configuration of a mirror servo mechanism in a background-art laser machining apparatus.
Figure 5:
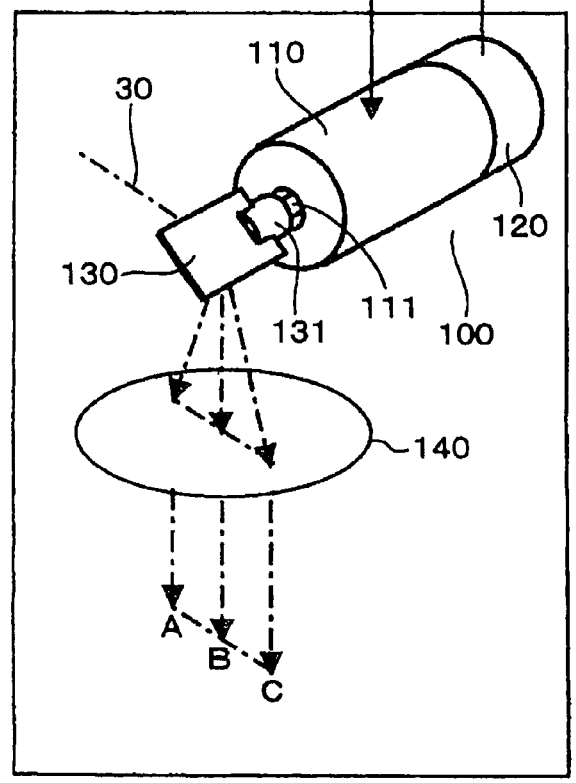

FIG. 4 is a configuration diagram of a printed circuit board perforating laser machining apparatus to which the present invention is applied. Units which are not essentially concerned with the invention are not shown in FIG. 4. In FIG. 4, a laser beam 30 outputted from a laser oscillator 310 enters an optical beam processing system constituted by a collimator 312, an aperture 314, etc., with a mirror 313a and a mirror 313b, so as to be shaped thereby. Further, the laser beam 30 is incident on a mirror of a first optical scanner 100a with mirrors 313c, 313d, 313e and 313f. The mirror of the first optical scanner 100a reflects an incident beam from the illustrated right side toward the illustrated front side when the mirror is in a neutral position. However, when the angle of the mirror is changed, the traveling path of the reflected beam can be changed within the illustrated horizontal plane, that is, in the illustrated left/right direction (Y-axis direction) in a spot position on an XY table. The beam reflected from the first optical scanner 100a is incident on a mirror of a second optical scanner 100b. The mirror of the second optical scanner 100b reflects an incident beam from the illustrated deeper side toward the illustrated lower side when the mirror is in a neutral position. However, when the angle of the mirror is changed, the traveling path of the reflected beam can be changed within the vertical plane in the illustrated front/rear direction, that is, in the illustrated front/rear direction (X-axis direction) in a spot position on the XY table. The beam reflected from the mirror of the second optical scanner 100b strikes a printed circuit board 352 mounted on an XY table 353, through an Fθ lens 140. The XY table 353 is driven in the Y-axis direction by a Y-axis drive mechanism 354, while the Y-axis drive mechanism 354 is driven in the X-axis direction by an X-axis drive mechanism 355. Thus, the XY table 353 can be positioned so as to be mounted in the X- and Y-directions. The X-axis drive mechanism 355 is fixed onto a bed 356. Each optical scanner 330a, 330b has a torque constant alteration compensating function as described above.

The torque constant alteration compensating function described above is provided as one of the functions of the optical scanner control unit 50. The torque constant alteration compensating function is set to be able to be used in initial setting for connecting a optical scanner to this control unit or in adjustment for replacing the optical scanner. In addition, this function can be operated from a remote site via a LAN and/or via the Internet, or a function of monitoring a measuring result can be also provided.

What is claimed is:

1. An optical scanner control method for operating an actuator for rocking a mirror based on a deviation of a current position from a commanded signal so as to control an outgoing angle of light incident on said mirror, said optical scanner control method comprising the steps of:
   measuring and memorizing data representing changes in torque constant of said actuator automatically, at plural rocking angles of said actuator prior to real operation; and
   correcting a manipulated variable of signal for said actuator using said data, so as to cancel said change in torque constant.

2. The optical scanner control method according to claim 1, wherein said measured data are values of a correction coefficient.

3. The optical scanner control method according to claim 1, wherein said measured data are coefficients of a curve determined with a least squares method applied to a set of correction coefficients and corresponding rocking angles.

4. An optical scanner for operating an actuator for rocking a mirror based on a deviation of a current position from a commanded signal so as to control an outgoing angle of light incident on said mirror, said optical scanner comprising:
   a measuring unit for measuring a change in torque constant of said actuator at plural rocking angles;
   a memory unit for storing data representing said changes measured by said measuring unit;
   wherein said measuring and storing data are performed prior to real operation; and
   a correcting unit for correcting a manipulated variable signal for said actuator using said data stored in said memory in real operation so as to cancel said change in torque constant.

5. A laser machining apparatus comprising:

an optical scanner by which a work is scanned and machined with a laser beam;

an actuator of the optical scanner operable for rocking a mirror based on a deviation of a current position from a commanded signal, so as to control an outgoing angle of light incident on the mirror;

a measuring unit for measuring a change in torque constant of the actuator at plural rocking angles prior to real operation;

a memory unit for storing data representing said changes measured by the measuring unit prior to real operation; and a correcting unit for correcting a manipulated variable signal for the actuator using the data stored in the memory in real operation, so as to cancel the change in torque constant.

* * * * *